F. C. OLDHAM.
RESILIENT WHEEL.
APPLICATION FILED OCT. 19, 1910.
1,026,822.
Patented May 21, 1912.
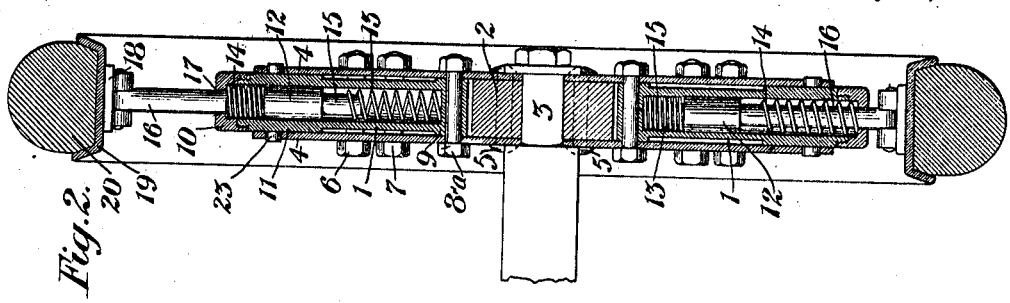
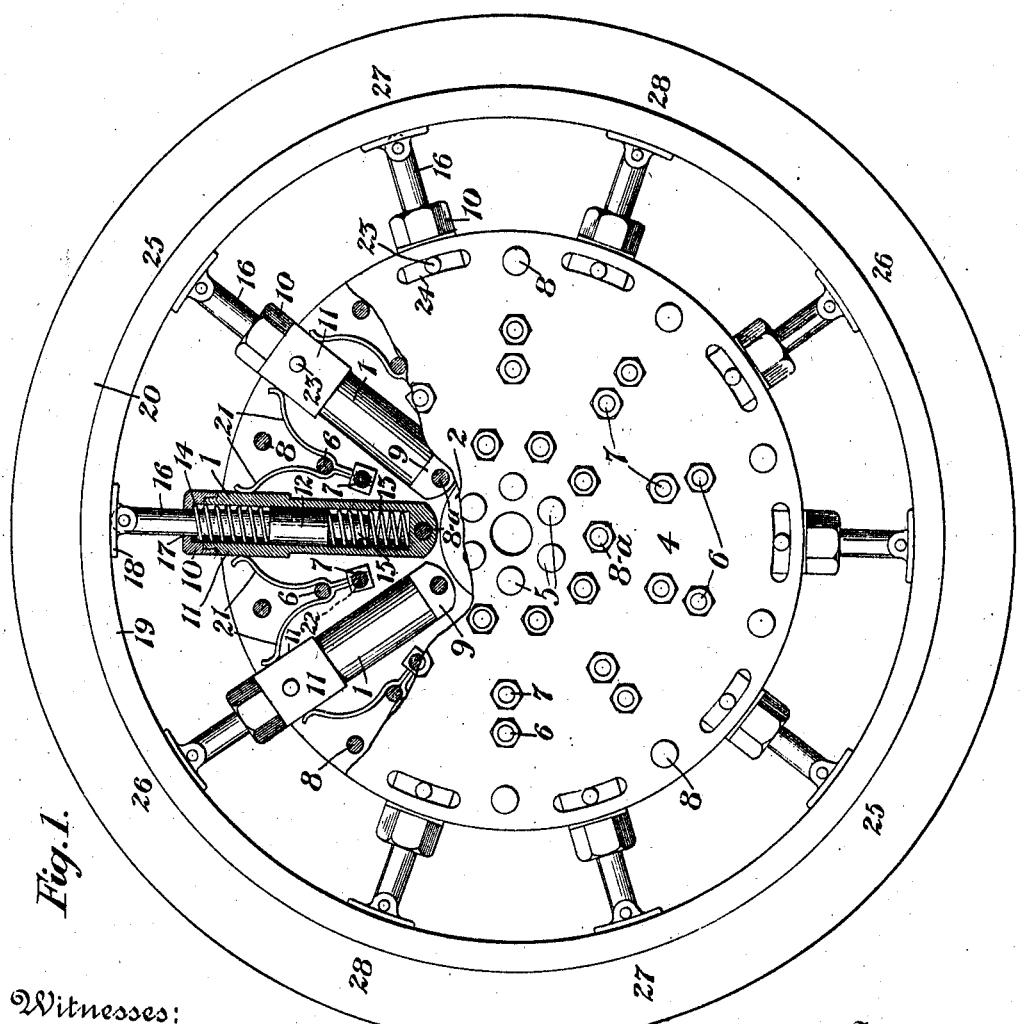

UNITED STATES PATENT OFFICE.

FREDERICK C. OLDHAM, OF BROOKLYN, NEW YORK.

RESILIENT WHEEL.

1,026,822.  Specification of Letters Patent.  Patented May 21, 1912.

Application filed October 19, 1910. Serial No. 587,961.

*To all whom it may concern:*

Be it known that I, FREDERICK C. OLDHAM, a citizen of the United States, residing at Brooklyn, in the county of Kings and State of New York, have invented certain new and useful Improvements in Resilient Wheels; and I do hereby declare the following to be a full, clear, and exact description of the invention, such as will enable others skilled in the art to which it appertains to make and use the same.

This invention relates to wheels for vehicles and particularly to resilient wheels as are necessary in automobiles.

The object of my invention is to provide a wheel of a simple and inexpensive construction which will obviate the necessity of rubber tires in having a construction for a wheel to give it resiliency by flexing its spokes in all directions, radially and circumferentially.

My invention consists of the parts and combinations hereinafter fully described and claimed.

In the accompanying drawing, Figure 1 is a partly sectional and partly full view of the wheel, and Fig. 2 is a longitudinal section of Fig. 1, but showing the wheel as it appears with the proper load on the axle, that is with the rim in the eccentric position.

Similar reference characters refer to similar parts in the different views of the drawing.

In this wheel, a plurality of spokes 1 extend radially in the conventional manner and their construction is alike in all, so that describing the construction of one will suffice for all the other spokes. The hub 2 is located centrally and mounted on the axle 3 in any ordinary manner. On each side of the hub are fastened the disk plates 4 by means of rivets 5. The rivets 8 serve to fasten the plates at their extremities and the bolts 6 7 and 8ª also hold the plates 4 together while serving essentially for other purposes as will be shown later. The spokes 1 are pivotally fastened at their extremities 9 to the plates by means of the bolts 8ª, said ends 9 being rectangular and flattened to afford bearing surface and are disposed near the hub 2. The spoke 1 is tubular within and its outer extremity is closed by the cap 10, the cap having flattened sides, preferably hexagonal, for the application of a wrench. Externally the spokes are flattened at the ends 11 to afford bearing surface with the plates 4, and the rest of the spoke between its ends is made cylindrical and thin enough to clear the said plates. Guide pins 23 pass through conforming slots in the plates and serve to guide the spokes when actuated circumferentially. Inside the tubular spoke 1 and slidable longitudinally is the flexible arrangement consisting of the plunger-piston 12 on either side of which are the helical springs 13 and 14. The lower projecting rod 15 serves as a guide within the spring 13 and the upper rod 16 extends from the piston 12 to the rim, passing through the spring 14 and the opening 17 in the cap 10 and is fastened pivotally to the flange 18 which in turn is rigidly fastened to the wheel-rim 19 carrying a solid rubber tire 20. The band springs 21 are disposed between the spokes and press circumferentially against them. The ends of the springs 22 are held in the slots provided on the square bolts 7 and are formed to grip the bolt 6 from where the bands separate and bear against the flat surface 11 of the spokes, the band springs being removable by the removal of the bolts 6 and 7.

When the vehicle is running, the desired resiliency of the wheel results from the action of the spokes, and particularly from the pair of spokes that is in the vertical position. In said position and referring to Fig. 2, the weight on the axle presses down the hub and plates 4 which are rigidly held together, and the rim being fastened to the rods 16 and pistons 12 is caused to assume the eccentric position shown in Fig. 2. This action compresses the spring 14 of the upper spoke and the spring 13 of the lower spoke, while the spring 13 of the upper spoke and the spring 14 of the lower spoke are merely extended to fill in their increased spaces, without having any effect.

It is evident that the adjacent spokes at 25 and 26 are acted upon similarly, though not to as great an extent, as the vertical rise of the rim at that point is not as great and therefore the action is proportional. The opposite spokes 27 and 28 have hardly any of the described action in this position, the vertical rise of the rim merely swinging these spokes circumferentially, the pivoted joints at 9 and 18 allowing the necessary freedom for this movement and the spokes being guided by the flat surfaces 11 bearing against the plates 4; the movement being taken up by the guide pins 23 in the slots 24. The spokes 25 and 26 also move slightly in this manner, since the rod 16 in that case has a diagonally resultant motion. The springs 21 in pressing forcibly against the spokes serve to take up this lateral swaying of the spokes which is desirable and necessary to give the spokes their circumferential flexibility. It will be evident that as the wheels roll along each pair of opposite spokes assume in their turn the vertical position shown in the drawing and are acted upon as described, after which they assume the other positions and in turn receive the various other described actions.

It will be perceived that when the wheel is running the above described construction and the action of the parts has the effect of pressing the rim against the springs 13 and 14 and disposing the rim to an eccentric position. Meanwhile, the spokes are pressed circumferentially by the eccentricity of the rim and the band springs 21 give way pressingly, thus resulting in giving elasticity to the entire wheel in every direction. Therefore, it can be seen that all the aforesaid objects and advantages of my invention are fully met, and that the wheel is compact, reliable and durable, and will absorb any shocks occurring from unevenness of road without transmitting it to the vehicle and occupants, thus conducing to the general improvement of automobile development.

It must be understood that my invention is not to be limited to the specific form of construction or arrangement as shown and described here, but that variations may be made in practice without however departing from the spirit and principles of my invention.

Having thus described my invention, I claim:—

1. In a resilient wheel, a hub, plates secured thereto, a plurality of telescopic spokes pivotally secured therebetween, a leaf spring secured between each set of spokes to said plates, and adapted to bear circumferentially against said spokes, guide slots in said plates, concentric with the swing of each spoke, lugs carried by spokes and adapted to register in said slots and limit the movement of the parts, the telescoping portion of the spoke having a piston adapted to fit snugly within said shell portion of the spoke, and helical springs within said shell portion of said spokes, adapted to bear against the closures at the ends of said shell portion and the ends of the piston.

2. In a resilient wheel for vehicles, a hub, plates secured thereto, a plurality of telescopic spokes pivotally mounted between said plates, helical springs within said spokes acting on both parts thereof, leaf springs carried by the side plates and between said spokes, said springs being adapted to bear circumferentially against said spokes and so arranged as to exert extreme pressure against only the spoke on which there is a circumferential strain, circumferential slots in said side plates struck from the center of the axis of the pivotal mounting of said spokes, lugs carried by said spokes adapted to register in said slots and help to carry the strain exerted upon said spokes.

In testimony whereof I affix my signature in presence of two witnesses.

FREDERICK C. OLDHAM.

Witnesses:
WILLIAM J. COLLINS,
GILBERT V. OLDHAM.

Copies of this patent may be obtained for five cents each, by addressing the "Commissioner of Patents, Washington, D. C."